United States Patent Office 3,320,139
Patented May 16, 1967

---

3,320,139
METHOD FOR PREPARING NEGATIVE ELECTRODES
Michael Golben, St. Paul, Minn., and Gustav A. Mueller, Montclair, N.J., assignors to Union Carbide Corporation, a corporation of New York
No Drawing. Filed Jan. 21, 1965, Ser. No. 427,132
6 Claims. (Cl. 204—35)

The present application is a continuation-in-part of our application for patent Ser. No. 83,145 which has now been abandoned. A division of said parent application, Ser. No. 83,146, has issued as United States Patent No. 3,203,879, granted Aug. 31, 1965.

This invention relates to the preparation of electrodes for use in alkaline cells, and more particularly for use as negative electrodes in nickel-cadmium and silver-cadmium secondary cells.

Negative electrodes designed for use in nickel-cadmium or silver-cadmium cells are generally prepared by impregnating a sintered nickel plaque with a suitable cadmium salt solution, such as a molten or saturated solution of cadmium nitrate, which is subsequently converted to cadmium hydroxide by electro-chemical polarization or precipitation in an alkaline electrolyte. A more recently developed process calls for the thermal decomposition of a similarly impregnated cadmium salt to cadmium oxide which is then subsequently converted to cadmium hydroxide by electrically forming (charge-discharge) the electrode in a caustic bath of sodium hydroxide or potassium hydroxide electrolyte. In all of these methods, it is necessary for the impregnation and conversion procedure to be repeated a number of times, usually four or five, until the required weight of active material has been deposited in the pores of the sintered plaque. In addition, when either the polarization or precipitation method is used, each impregnation and conversion must be followed by a washing and drying step which requires considerable expenditure of time and effort. Furthermore, the sintered nickel plaque used as the supporting and conductive structure of the electrode is expensive and contributes significantly to the cost of producing such electrodes. Another disadvantage in these processes is the high cost of the cadmium salt of which the impregnating solution is composed. Often the impregnation takes place at reduced pressure thereby requiring additional equipment for production of vacuum and involving additional labor expense.

Other methods which have been suggested by the art for producing cadmium hydroxide negative electrodes all possess some undesirable feature or features. For example, a method has been suggested whereby cadmium hydroxide is mixed with suitable conductive and cohesive materials and pressed or extruded onto a supporting metallic grid. Again, the cadmium hydroxide is a relatively expensive material, and costly equipment is required to perform the mixing and extrusion. Furthermore, the electrode so produced is generally not suitable for all applications for which the sintered electrode is normally used.

Accordingly, the principal object of the present invention is to provide a method for producing negative cadmium hydroxide electrodes which avoid the disadvantages of the prior art.

A more specific object is to provide a method by which negative cadmium hydroxide electrodes may be prepared faster and more economically than by methods of the prior art.

A still more specific object of the invention is to provide a method for producing negative cadmium hydroxide electrodes which permits the use of cadmium metal rather than a more expensive cadmium salt as a source of the active material.

Broadly stated, the objects of the invention are accomplished by a method which comprises immersing a suitable open mesh or perforated conductive metal matrix in an aqueous solution of a cadmium salt in which one or more electrodes made of cadmium metal are also immersed. Electrodeposition is carried out using the cadmium electrode as the anode and the conductive metal matrix as the cathode. Nitric acid is added to the solution to maintain an essential proper pH level. The deposit which forms in the interstices of the conductive metal matrix is a complex of nitrogen-cadmium hydroxide.

More specifically, in the practice of the invention any one of the following has been found to be a suitable conductive matrix; nickel mesh screen, expanded nickel metal, perforated nickel plate, punctured nickel foil. Of course, nickel plated conductive materials may be substituted for the pure nickel structures recited above. In any particular application, the conductive matrix which is employed is the one which is the least expensive and which will accomplish the design purpose of supporting the active material providing the largest feasible interstices for negative active material and carrying the current in the cell where it is employed. The most generally useful matrix has been found to be nickel wire screen having a mesh consistent with the final electrode thickness desired. For example, a mesh of 40 x 40 with a .007 inch wire is chosen for electrodes of .020 inch final thickness. The mesh size is chosen so that the amount of active material will, after treatment, fill the interstices of the matrix completely, thereby resulting in an electrode having a smooth surface. Examples of suitable non-porous matrixes are, as hereinbefore indicated, nickel mesh screen, expanded nickel metal, perforated nickel plate and punctured nickel foil. A practical range of hole sizes is from about .015 inch by .015 inch to about .045 inch by .045 inch for mesh screens or equivalent area of expanded or perforated metal matrixes. The number of openings per square inch may range from approximately 400 to 1600.

As an example of our method, the selected conductive matrix was nickel wire screen of mesh 40 x 40 with .007 inch wire. This matrix was immersed in an approximate 50 percent by weight at 25° C. cadmium nitrate aqueous solution. The concentration of the cadmium nitrate is not critical to the process, but high concentrations in general permit high current densities.

It is important that the pH be closely controlled during the electrodeposition in the cadmium salt solution to maintain the proper plating environment. There is a tendency for the pH to rise as plating continues. This not only affects the quality of the plating but also causes a build-up of anodic sludge. The addition of nitric acid was found suitable to maintain the pH at the desired level and also to facilitate the dissolution of the anodic sludge. The most desirable pH range was found to be from about 1.4 to 2.3 pH. When the pH is allowed to drop substantially below 1.4, the cathodic deposit dissolves When the pH rises above 2.3 the anodic sludge does not dissolve at a sufficiently rapid rate.

Continuous plating causes the temperature of the cadmium nitrate to rise. Consequently, temperature control is an important aspect for the proper operation of our process and suitable equipment is provided to effect its control. The temperature of the solution should be maintained, for best results, between 20 and 30 degrees C. This produces a uniform close deposit. Temperatures above 30 degrees C. result in a poorly adherent, softer deposit. However, temperatures slightly above 30 degrees C. can be tolerated for a short period of time without harmful results.

The electrolyte that has been found most practical is a cadmium-nitrate solution of 1.5 molar concentration. More dilute solutions cause a softer deposit and higher concentrations cause the deposit to become brittle. One or more electrodes of cadmium metal are immersed in the same solution. Electrodeposition is then carried out at a current density from as low as .03 ampere/square inch to as high as 6 amperes/square inch of cathode area using the cadmium electrodes as the anode and the conductive matrix as the cathode. It is generally more economical to use high current densities when possible since this reduces the size of the equipment required. As is well known in the art, there are limitations on the use of high current densities such as the ability of the matrix to carry excessively high currents and the necessity for removing considerable heat generated in the bath.

The initial deposit which forms in the interstices of the cathode is in amphorphous complex of nitrogen and cadmium hydroxide.

A white deposit which forms at the cadmium anode is a complex of cadmium oxide and cadmium nitrate. This complex is redissolved by the nitric acid in the bath so that it exists only temporarily. Thus, it may be seen that it is not required to make additions of expensive cadmium nitrate salt to the solution, since the cadmium metal anode or anodes is the source of the cadmium which plates in the interstices of the cathode, rather than the cadmium nitrate salt. Subsequently, the thus plated matrix is removed from the plating bath and any excess nitrate is washed off. It has been found that it is easier to wash off any such excess nitrate (or other undesirable reaction product) from the plated electrodes of the invention as opposed to electrodes which are prepared by the prior art methods of thermal decomposition or polarization of the nitrate wherein residual traces of unreacted nitrate may be trapped at the bottom of the interstices. In the subject process any residual nitrate lies on the surface where it is more readily removable. This is important because it is believed that nitrates are responsible for self-discharge of batteries in which the electrodes are incorporated.

As will be understood by those skilled in the art, control of the quantity of cadmium hydroxide complex formed in the interstices of the conductive matrix is effected by regulation of time and current density of plating. Immersion in the plating bath for from 2 to 4 minutes is preferred. Control of the texture of the deposit is effected by regulation of current density, temperature, solution concentration, addition of various agents and the particular conductive matrix employed. These variations in plating conditions do not, of course, affect the basic novelty of the disclosed method and no such limitation is intended.

As a result of a single pass of the conductive matrix through the strongly acid electrolyte we obtain a spongy mass of the cadmium complex in sufficient quantity to form a satisfactory negative electrode after washing, forming and compressing. The electrodeposited mass adheres sufficiently securely to the matrix to permit washing of the deposit in a water spray to remove substantially all of the undesirable reaction products of the cadmium salt and nitric acid in the electrolyte. The washing step may follow immediately after the withdrawal of the negative electrodes from the plating bath. The electrodeposited mass is then reduced electrolytically to a spongy metallic cadmium in a caustic electrolyte. They are then pressed between rollers or flat plates to reduce the spongy mass to the thickness desired and oxidized electrolytically to cadmium hydroxide. Further processing by conventional methods may follow.

As herein described, a plating bath containing cadmium nitrate and nitric acid has been shown to be most effective. It is believed, however, that other cadmium salts such as $CdCl_2$ or $Cd(C_2H_3O_2)_2$ may be used in the bath.

A series of tests have been run by us to determine whether positive nickel electrodes may be made by a single pass method such as that hereinbefore described for negative electrodes. The object of these tests was to deposit nickel hydroxide in conductive metal matrixes having open interstices of sizes comparable with those of the negative electrode conductive matrix. In these tests we used nickel nitrate in a 50% aqueous solution as the electrolyte in the bath for the electrolysis wherein the anodes were nickel plates and the cathodes nickel or nickel plated matrices having open interstices of the sizes herein described. These tests showed that the nickel hydroxide deposited on the matrices does not adhere in sufficient quantity to secure beneficial results. Our tests further showed that satisfactory quantities of the positive active material were obtained only when the cathodes in the bath consisted of porous sintered nickel bodies or other conductive material having relatively fine pores.

While the present invention has been described in detail as applied to negative electrodes for nickel-cadmium cells, such electrodes are equally suitable for use in silver-cadmium cells wherein the positive electrodes may consist of silver oxides.

We claim:
1. A method of preparing a negative electrode for use in alkaline galvanic cells which comprises the steps of preparing a plating bath from an aqueous solution of cadmium nitrate [$Cd(NO_3)_2$]; immersing in said bath a conductive metal matrix having open interstices each extending through the matrix and of a substantially uniform size, and also immersing in said bath at least one electrode of cadmium metal; then passing a current through said bath utilizing the cadmium electrode as an anode and said conductive matrix as a cathode, and at the same time adding a sufficient quantity of nitric acid to said bath to maintain the pH thereof in the range of 1.4 to 2.3, thereby depositing an adhering nitrogen-cadmium hydroxide complex in the interstices of said conductive matrix and on other surfaces thereof, the amount of said complex deposited being sufficient to completely fill said interstices.

2. The method of claim 1 wherein the current density is in the range of from .03 to 6.0 amperes per square inch of cathode area and said temperature of the plating bath is maintained within the range of about 20 degrees C. to about 30 degrees C.

3. The method of claim 1 in which the size of said interstices corresponds to an opening within the range of from about .015 inch by .015 inch to about .045 inch by .045 inch.

4. The method of claim 1 wherein said complex is washed, reduced to spongy metallic cadmium, the resulting article is pressed and the cadmium is oxidized to cadmium hydroxide to provide a negative electrode having a smooth surface.

5. The method of claim 4 in which said complex is electrolytically reduced in a caustic electrolyte and said spongy metallic cadmium is oxidized electrolytically to cadmium hydroxide.

6. A method of preparing a negative electrode for use in alkaline galvancic cells which comprises the steps of preparing a plating bath of approximately 50% cadmium nitrate aqueous solution, immersing in said bath a plurality of cadmium electrodes and a non-porous conductive matrix having open interstices each extending through the matrix, said matrix being chosen from the group consisting of nickel matrices and nickel plated matrices, electroplating said matrix with a current density of from 0.03 to 6.0 amperes per square inch of cathode area, utilizing said cadmium electrodes as anodes and said non-porous conductive matrix as a cathode and at the same time adding a sufficient quantity of nitric acid to said bath to maintain the pH thereof within a range of 1.4 to 2.3 and cooling said bath to a temperature of about 20 degrees C. during plating, whereby a complex of cadmium hydroxide and nitrogen is desposited on said non-porous metal matrix, the amount of said complex deposited being sufficient to completely fill said interstices.

References Cited by the Examiner

UNITED STATES PATENTS

| | | | |
|---|---|---|---|
| 1,402,751 | 1/1922 | Edison | 136—28 |
| 3,160,577 | 12/1964 | Nolan | 136—86 |
| 3,214,355 | 10/1965 | Kandler | 204—56 |

FOREIGN PATENTS 613,025   1/1961   Canada.

JOHN H. MACK, *Primary Examiner.*

HOWARD S. WILLIAMS, *Examiner.*

G. KAPLAN, *Assistant Examiner.*